(12) United States Patent
Dumitras et al.

(10) Patent No.: US 7,057,671 B2
(45) Date of Patent: Jun. 6, 2006

(54) IMAGE AND VIDEO PROCESSING WITH CHROMINANCE ATTENUATION

(75) Inventors: Adriana Dumitras, Red Bank, NJ (US); Barin Geoffry Haskell, Tinton Falls, NJ (US)

(73) Assignee: AT & T Corp, New York, NY (US)

( * ) Notice: Subject to any disclaimer, the term of this patent is extended or adjusted under 35 U.S.C. 154(b) by 736 days.

(21) Appl. No.: 10/123,993

(22) Filed: Apr. 16, 2002

(65) Prior Publication Data

US 2003/0160900 A1 Aug. 28, 2003

Related U.S. Application Data

(60) Provisional application No. 60/353,201, filed on Jan. 30, 2002.

(51) Int. Cl.
*H04N 9/64* (2006.01)

(52) U.S. Cl. .................. 348/649; 348/453; 348/630
(58) Field of Classification Search .............. 348/453, 348/649, 651, 630, 645, 253, 256; 358/518; 382/162, 276, 167; 345/600, 603
See application file for complete search history.

(56) References Cited

U.S. PATENT DOCUMENTS

| | | | |
|---|---|---|---|
| 4,096,513 A | | 6/1978 | Ross |
| 5,274,439 A | | 12/1993 | Dischert et al. |
| 5,450,124 A | | 9/1995 | Sugiura et al. |
| 5,691,779 A | * | 11/1997 | Yamashita et al. .......... 348/645 |
| 5,737,032 A | | 4/1998 | Stenzel et al. |
| 6,023,305 A | | 2/2000 | Ando et al. |
| 6,049,399 A | * | 4/2000 | Shyu ..................... 358/520 |
| 6,754,399 B1 | * | 6/2004 | Pettigrew et al. .......... 382/276 |
| 2001/0008428 A1 | * | 7/2001 | Oh ........................ 348/649 |

OTHER PUBLICATIONS

Ningyan Liu et al, A Solution to the Dynamic Range Problem of Pixel Values in Color Image Enhancement, Proceedings of the Intl. Symposium on Speech, Image Processing and Neural Networks, Apr. 13–16, 1994. Hong Kong, pp. 772–775.

Philip A Mlsna et al, A Multivariate Contrast Enhancement Technique for Multispectral Images, IEEE Transactions on Geoscience and Remote Sensing, vol. 33, No. 1, Jan. 1995, pp. 212–216.

Kyeong–Man Kim et al Color Image Enhancement by Highlight–Preserving Vector Transformation and Nonlinear Mapping, Proceedings of the International Conference on Image Processing (ICIP), 1998, vol. 1, pp. 201–205.

Christopher C. Yang et al, Gamut Clipping in Color Image Processing, Proceedings of IEEE International Conference Image Processing (ICIP), 2000, pp. 824–827.

Soo–Chang Pei and You–Shen Lo, Color Image Compression and Limited Display Using Self–Organization Kohonen Map, IEEE Transactions on Circuits and Systems for Video Technology, vol. 8, No. 2 Apr. 1998, pp. 191–205.

* cited by examiner

*Primary Examiner*—Victor R. Kostak
(74) *Attorney, Agent, or Firm*—Ronald D. Slusky

(57) ABSTRACT

The values of the primary color space components of an image signal, such as the components of RGB video signal, are maintained within their allowed range by modifying the signal in a different color space, such as YUV space. Specifically, the U and V chrominance components are attenuated by an attenuation factor g while the luminance component Y is not modified. The value of g is the largest possible value less than 1 that will cause all primary color space components that would otherwise be outside the allowed range to be within that range. A high quality of the displayed image is maintained.

13 Claims, 6 Drawing Sheets

FIG. 6

| FIG. 3 |
| FIG. 4 |
| FIG. 5 |

US 7,057,671 B2

IMAGE AND VIDEO PROCESSING WITH CHROMINANCE ATTENUATION

CROSS-REFERENCE TO RELATED APPLICATION

This application claims the priority of U.S. provisional patent application Ser. No. 60/353,201 filed Jan. 30, 2002.

BACKGROUND OF THE INVENTION

The present invention relates to the processing of pictures, including still images and video sequences. For convenience, the term "image" will be used herein to refer both to still images and to video sequences.

Images are represented in digital form as an assembly of picture elements, or pixels. Each pixel is represented by one or more component values. In the case of color images, for example, the picture information of each pixel may be represented by the values of three components R, G and B, corresponding to the primary colors red, green and blue. For any given pixel, the combination of those three colors at an intensity indicated by their respective component values reproduces the picture information of the pixel in question. Each component can take on any one of a predetermined set of values, such as the integers from 0 to 255. The universe of all possible combinations of the values of R, G and B is referred to as primary color space.

An image can be represented in other spaces as well. This is advantageous in that the representation of an image in spaces other than primary color space may require fewer bits of information, thereby reducing the bandwidth and/or time needed in order to transmit and/or store the image. For example, an image can be represented in so-called luminance-chrominance space in which each pixel is represented by a component indicative of the luminance, or brightness, of the pixel and two or more other components indicative of its color content. One such luminance-chrominance space is YUV space, wherein each pixel is represented by three component values referred to as Y, U and V, Y being the luminance component and U and V being the chrominance components. Another luminance-chrominance space is YIQ space wherein the component Y is, again, the luminance component and I and Q are components representing chrominance in another form. Other color spaces, such as HSV (hue, saturation, value), are also known.

Linear transformations readily convert an image represented in one space into an image represented in another. For example, conversion of an image from primary color space to YUV space is effectuated by way of the transformation $Y = x_1 R + y_1 G + z_1 B$ $U = x_2 R + y_2 G + z_2 B$ $V = x_3 R + y_3 G + z_3 B$ where $x_1$, $x_2$, $x_3$, $y_1$, $y_2$, $y_3$, $z_1$, $z_2$ and $z_3$ are predefined coefficients.

The display of an image on, for example, a video screen or in a color print document typically requires that the signal applied to the device representing the image be represented in primary color space. This is a consequence of the fact that the display device itself, such as a cathode ray tube or color printer, represents each pixel as a cluster of three primary color dots, each having an intensity and/or size determined by the respective component value. It turns out, however, that a primary color space representation of an image is typically not the most efficient way to represent an image. Thus, in a typical image communication system, for example, the image is scanned by a still or video camera in primary color space (such as RGB), is converted to a luminance-chrominance space (such as YUV) and is encoded using a standardized encoding algorithm such as one of the MPEG standards. The bits carrying the information content of the image as generated by the MPEG coder are transmitted to a receiver, at which point they are MPEG-decoded to recover the luminance-chrominance representation of the image. The latter is then converted back into primary color space and presented to a display.

A problem that arises in this context is that the components that represent the image in non-primary-color space, such as Y, U or V, may be modified from their original values at any of a number of points in the overall system for any of a number of reasons. These include, for example, the presence of communication errors, and operations such as filtering, noise reduction and various kinds of enhancements. As a consequence, when the image representation is converted back into primary color space for display, the values of one or more of the primary color space components may be different from what they were originally. The displayed image will thus be different in at least one of its characteristics, such as intensity, contrast or color.

A particularly troublesome effect in this regard occurs if, as the result of changes in the component values of the image during transmission or other processing, the component values that result upon conversation of the image back to primary color space fall outside of their allowed range. For example, in a typical image coding/communication environment, each component is represented as an 8-bit word, allowing for $2^8 = 256$ possible bit combinations corresponding to the 256 decimal values 0–255. Depending on how Y, U or V got modified, the values of R, G and/or B realized upon the conversion back to primary color space may be outside of the allowed range, i.e., less than 0 or greater than 255. The display device, however, is only capable of representing R, G and B values that are within that range. The most straightforward way of addressing this is to change the value of R, G and/or B that is outside of the allowed range to the edge of the range, this being referred to as clipping. Thus R, G or B values that are less than 0 are made equal to 0, and values that are greater than 255 are made equal to 255. Although quite simple, this approach can result in significant degradation of the image, including color shifts and/or loss of contrast. Accordingly, more sophisticated approaches have been proposed. Such approaches may, for example, modify the value of not only the primary color space component (e.g., R, G or B) that was out of the allowed range, but even the values of components that are already within the allowed range—all with a view toward minimizing the image's degradation, i.e., with a view toward having the displayed image appear as much like the original as possible.

SUMMARY OF THE INVENTION

Although the various prior art approaches to modifying the primary color space component values can achieve at least some success in minimizing degradation of the image, we have recognized that further improvement is possible. Indeed, we have devised a technique which can provide results that are dramatically better than those achieved by prior art techniques. As such, our technique is particularly advantageous for use in the display of high quality entertainment movies although it can be used to advantage in virtually any image processing/display context, including not only video visualization but also video editing, augmented reality and virtual reality applications, computer graphics, and computer games, as well as in still image applications.

In accordance with the invention, the component value modification is carried out in a space other than the primary color space. The modification is such that upon re-conversion of the image representation into primary color space, at least one, and preferably all, of the primary color space component values are within their respective allowed ranges. By carrying out component value modification in a space other than primary color space, it is possible to bring all the primary color component values to within their allowed range(s) while yet preserving one or more desired qualities of the image.

For example, illustrative embodiments of the invention are carried out in a luminance-chrominance space, such as YUV. Illustratively, the value of the luminance component Y is not modified at all. Rather, only the chrominance components U and V are modified.

In preferred embodiments, the values of U and V are each attenuated by a common factor g<1. The value of g is the largest possible value <1 that will cause all primary color space components that would otherwise be outside the allowed range to be within that range.

Advantageously, keeping the luminance value unchanged preserves the brightness and contrast qualities of the image. Our approach, moreover, has only a small yet imperceptible effect on saturation. A particular advantage of carrying out the processing on a YUV representation of the image is that YUV is the form of image representation that is commonly worked with by MPEG and other standard image coders. Thus the invention does not require any additional types of conversions of the image beyond those that would normally be carried out in any event.

DETAILED DESCRIPTION

Figure 1:
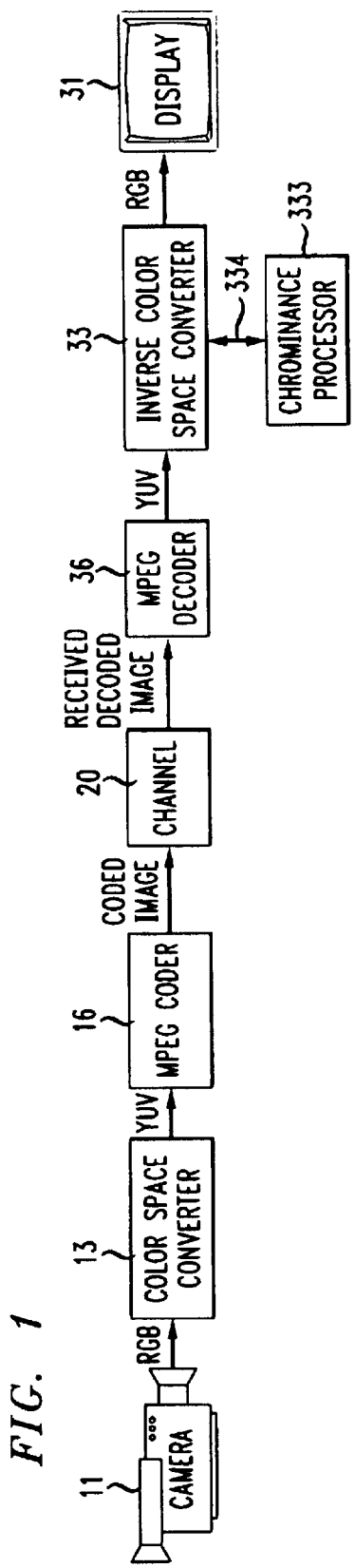
FIG. 1 shows an illustrative image communication system which includes a chrominance processor that operates in accordance with the principles of the invention.

The system of FIG. 1 communicates a picture from a camera 11 to a display 31 over a communication channel 20. The picture is illustratively a sequence of video frames. However, the invention also applies to systems in which only a single image frame is communicated. The term "image" is used herein to refer to both still images and video sequences.

In particular, camera 11 generates an image signal in RGB space. The R, G and B components representing and associated with each pixel are provided to color space converter 13. The latter converts the RGB signal to a YUV signal. That is, the signal representing the image is converted from a primary color space, specifically RGB space, to a luminance-chrominance space, specifically YUV space. The YUV signal is provided to MPEG coder 16 which encodes the YUV signal in accordance with a standard MPEG video coding algorithm.

The output of coder 16 is a bit stream that is applied to communication channel 20. Although not explicitly shown in the FIG., channel 20 may include not only electrical and/or optical communication lines but also various pieces of processing equipment including modulators, demodulators, equalizers, channel coders and decoders, multiplexers, switches and the like.

The MPEG-encoded bit stream representing the image in compressed form is provided from channel 20 to MPEG decoder 36 which performs the inverse operation of MPEG coder 26. As a result, the output of MPEG decoder 36 is a received version of the YUV signal generated by color space converter 13. The YUV signal is converted to RGB form by inverse color space converter 33. The RGB signal is, in turn, applied to display 31, which displays the image.

The structure and functionality of system of FIG. 1 as thus far described are conventional and well understood by those skilled in the art. Accordingly, it is not necessary to set forth further details as to the operation of this system and/or to describe various other components that the system may include but are not explicitly shown in FIG. 1, other than to describe the operation of chrominance processor 333 and its interaction with inverse color space converter 33 in carrying out processing embodying the principles of the present invention.

Before specifically describing that processing, however, it will be helpful to consider the theoretical underpinnings of the invention.

We begin by noting that the transformation of a pixel representation from YUV space to RGB space can be described mathematically by $$R=Y+a_1U+b_1V$$

$$G=Y+a_2U+b_2V$$

$$B=Y+a_3U+b_3V$$

where $a_1$, $a_2$, $a_3$, $b_1$, $b_2$, $b_3$ are predefined coefficients. For purposes of discussion, the value of each of the components R, G and B can be said to have a luminance contribution given by the value of Y, and a chrominance contribution given by the value of the quantity $(a_iU+b_iV)$.

The luminance Y has an allowed range of values $Y_{min} \leq Y \leq Y_{max}$. We will assume that, as is generally the case, the allowed range of values for each of R, G and B is the same as for Y. If R, G and/or B have different allowed ranges, generalization of the techniques described here is straightforward. Generalization of the techniques described here is also straightforward if the primary color space representation of the image involves more than three primary colors.

Thus the goal is to ensure that the actual values of R, G and B as presented to display 31 lie in the allowed range $[Y_{min}, Y_{max}]$. Ordinarily R, G and B, when generated by camera 11, will always be within that range. As noted earlier, however, any of a variety of occurrences within the communication equipment or communication channel—including, for example, the presence of communication errors, and operations such as filtering, noise reduction and various kinds of enhancements—may cause the values of R, G and/or B for one or more pixels to be out of that range unless measures are taken to prevent that or to correct for it.

In order to effectuate the correction, we may first define parameters c and d as follows:

$$c = \max_{1 \leq i \leq 3} (a_iU + b_iV) \qquad (2)$$

$$d = \min_{1 \leq i \leq 3} (a_iU + b_iV) \qquad (3)$$

The value of c is the largest of R, G and B's chrominance contributions. If $Y+c>Y_{max}$, then at least one of the primary color components R, G and B exceeds the maximum allowable value $Y_{max}$. The value of d is the smallest of R, G and B's chrominance contributions. Indeed, the value of d can be less than 0 because any one or more of U, V and the coefficients $a_1$, $a_2$, $a_3$, $b_1$, $b_2$, $b_3$ can be less than 0. Thus even if $Y_{min}=0$, it is possible for $Y+d<Y_{min}$, in which case at least one of the primary color components R, G, B is less than the minimum allowable value $Y_{min}$.

In accordance with the invention, R, G and B are made to all be within their allowed range by modifying, in other than primary color space, components representing the image. In this example, the modifications are carried out in luminance-chrominance space—more particularly YUV space. Specifically, the modifications are such as to attenuate U and V by an attenuation factor g, $0 \leq g<1$, the value of g being the largest value between 0 and 1 that, upon re-conversion of the image representation into primary color space, causes all three RGB components to be within the allowed range $[Y_{min}, Y_{max}]$. The value of attenuation factor g is, of course, different for each pixel.

The value of the attenuation factor g is actually the smaller of two attenuation factors e and f. Attenuation factor e is the factor by which U and V would need to be attenuated to bring to within the allowed range $[Y_{min}, Y_{max}]$ all primary color space components that are above that range, i.e., are greater than $Y_{max}$. Attenuation factor f is the factor by which U and V would need to be attenuated to bring to within the allowed range $[Y_{min}, Y_{max}]$ all primary color space components that are below that range, i.e., are below $Y_{min}$. Again, attenuation factor g is the smaller of e and f. We define the attenuated versions of U and V as U' and V' given by $$U' = \min(e,f)U = gU \quad (4)$$

$$V' = \min(e,f)V = gV \quad (5)$$

where "min" means "the minimum of" and define the values of R, G and B that ultimately result from the YUV space modification as being R', G' and B'. Then from Eq. (1)

$$R' = Y + a_1(U') + b_1(V')$$

$$G' = Y + a_2(U') + b_2(V')$$

$$B' = Y + a_3(U') + b_3(V') \quad (6)$$

It is important to note that the luminance contribution of each of the primary color components is unchanged by this process. Also important to note is that the values of all three primary color components are modified by this process even if one or more of them is already within the allowed range $[Y_{min}, Y_{max}]$. We have discovered that this combination of characteristics of the modifications made to the image representation in luminance-chrominance space substantially preserves the brightness and contrast qualities of the image. Our approach, moreover, has only a small yet imperceptible effect on saturation. It remains only to see how the values of e and f, and thus of g, are determined.

Consider first the possibility that one or more of the RGB components is outside of the allowed range $[Y_{min}, Y_{max}]$ by being greater than $Y_{max}$. Reducing the value of that RGB component to $Y_{max}$, while preserving its luminance contribution Y, as desired, means reducing its chrominance contribution to be no larger than $c' = Y_{max} - Y$, i.e., the difference between the maximum allowed value $Y_{max}$, and its luminance contribution, which is to remain unchanged. The chrominance contribution that most exceeds $Y_{max}$ is given by the parameter c defined above. Thus it can be said that reducing the value of that component to $Y_{max}$ will have effectuated an attenuation of its chrominance contribution by an attenuation factor e, given by $$e = \frac{c'}{c} \quad (7)$$

Figure 2:
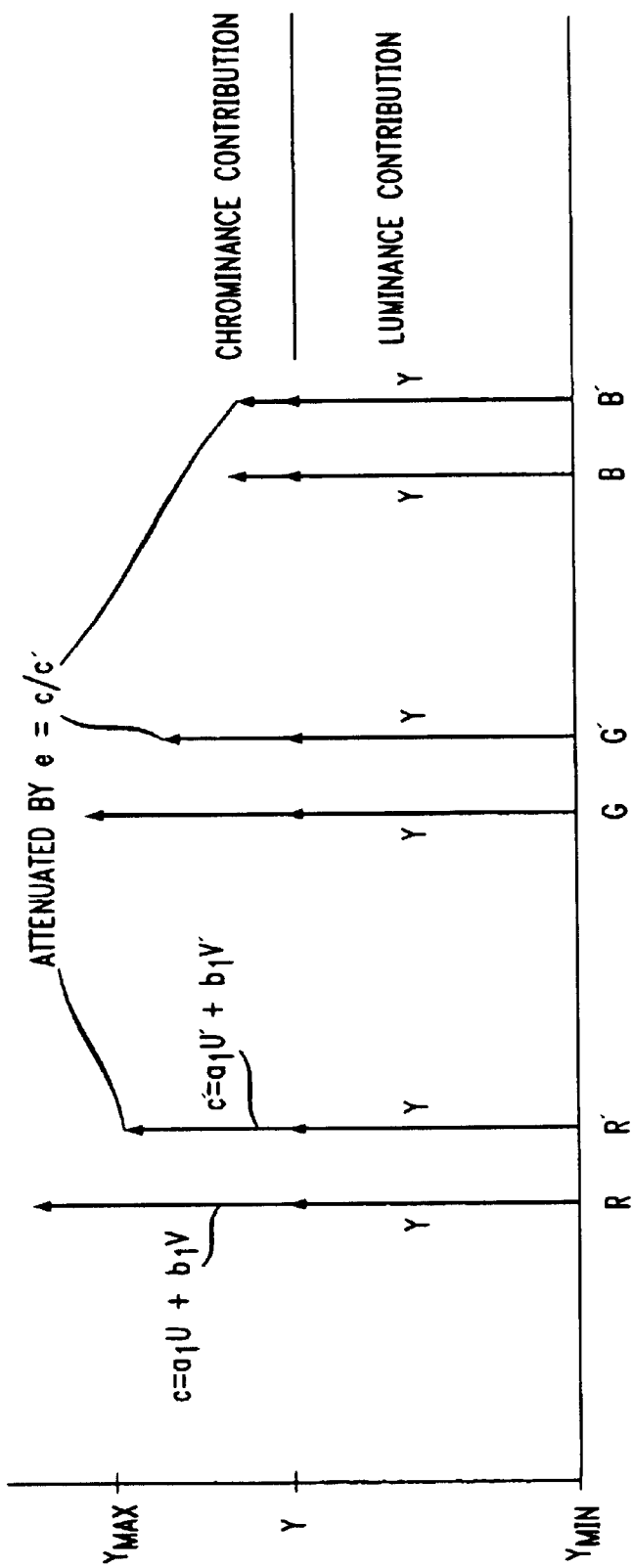
FIG. 2 is a graph helpful in understanding the principles of the invention.

The above is represented graphically in FIG. 2. This graph shows primary color space component values R, G and B for a particular pixel before processing pursuant to the invention and the values of those components, labeled R', G' and B', after processing. The luminance contribution for each one of the components R, G and B is the same, namely Y. Illustratively, the values of both R and $G > Y_{max}$. The chrominance contribution $a_1U + b_1V$ of component R is illustratively the largest of the chrominance components of the three components R, G and B. Thus it is the chrominance contribution of R that defines the value of factor $c = a_1U + b_1V$. The value of component R is reduced to be equal to $Y_{max}$, making the chrominance contribution of R' become $c' = a_1U' + b_1V'$ which, as can be seen from FIG. 2, is equal to $Y_{max} - Y$. This is actually carried out in YUV space and is accomplished by attenuating the values of U and V to new values $U' = eU$ and $V' = eV$, where e is as defined above. Alternatively stated, the chrominance contribution c of component R has been attenuated by the factor e, inasmuch as $$c' = a_1U' + b_1V' = a_1eU + b_1eV = e(a_1U + b_1V) \quad (8)$$

As also shown in FIG. 2, the values of the respective chrominance contributions of G and B are also attenuated by the factor e. This is simply a consequence of the fact that U and V are attenuated by that factor. It will be recalled that the value of G was also greater than $Y_{max}$. However, since the chrominance contribution of G was smaller than that of R, then the value of G' will certainly now be less than $Y_{max}$. And even though the value of B was already less than $Y_{max}$, its chrominance contribution is also reduced by the factor e. In effect, then, we have attenuated the chrominance contribution of each primary color component by the attenuation factor e. This, of course, effectuates an attenuation of the values of R, G and B in primary color space. However, the degree of attenuation is different for each of them inasmuch as the luminance contribution Y is not changed. The only way we can determine the appropriate new values of R, G and B—that is, the values of R', G' and B'—is to carry out the processing in (in this example) luminance-chrominance space, as just described, allowing the chrominance contribution to be treated separately from the luminance contribution.

If none of the components R, G or B is below the allowed range $[Y_{min}, Y_{max}]$, then the factor g of Eqs. (4) and (5) will, in fact, be given by the value of e. However, we must take into account the possibility that the value of one or more RGB components could be smaller than $Y_{min}$. If there is an R, G, or B component that is less than $Y_{min}$, then the one of these that is most below $Y_{min}$ needs to have its value changed to $Y_{min}$ itself. Following the same logic as set forth above, this is actually carried out in YUV space and is accomplished by attenuating the chrominance contribution of the R, G or B component in question by an attenuation factor f, given by $$f = d'/d$$

where $d' = Y_{min} - Y$. Further following the logic set forth above, it can be seen that using the value of parameter f as the attenuation factor g will ensure that all RGB components whose values are less than $Y_{min}$ will be modified to be within the allowed range $[Y_{min}, Y_{max}]$.

If a particular pixel has both an RGB value greater than $Y_{max}$ and another RGB value less than $Y_{min}$, the value of g should be the smaller of the attenuation factors e and f, as indicated in Eqs. (4) and (5), thereby ensuring that all RGB values—both those above $Y_{max}$ and those below $Y_{min}$—will be at or within the allowed range $[Y_{min}, Y_{max}]$.

Before we proceed to a further consideration of the illustrative embodiment, two points relative to the above-mentioned provisional patent application are appropriate for discussion here. Firstly, it may be noted that the provisional application uses both the term "clipping" and the term "attenuation" to refer to the processing described herein embodying the principles of the invention. The term "clipping" is, indeed, an apt one to some extent in that in this embodiment the value of g is such that the most out-of-range component is always reduced to the same value, namely one of the limits of the allowed range $[Y_{min}, Y_{max}]$—those limits being, in this example, $Y_{min}=0$ or $Y_{max}=255$. In that sense the invention bears some similarity to prior art techniques that are, in fact, referred to as clipping techniques. In the present invention, however, any other primary color space component whose value is changed is not clipped to a specific value. Rather, its magnitude is reduced to a value that is determined by the multiplicative attenuation factor g. In that sense it is helpful to think of, and refer to, processing that implements the invention not as being "clipping" but as "attenuation." The latter term, then, rather than the former, is used herein. Moreover, it is stated in the provisional application that the present invention is applied in primary color space. In light of the disclosure in the provisional application, much of which is repeated and/or expanded upon here, those skilled in the art, upon reading the text of the provisional application, will realize that the invention is not applied in the primary color space but rather, to the contrary, is applied in a space other than primary color space.

Figure 3:
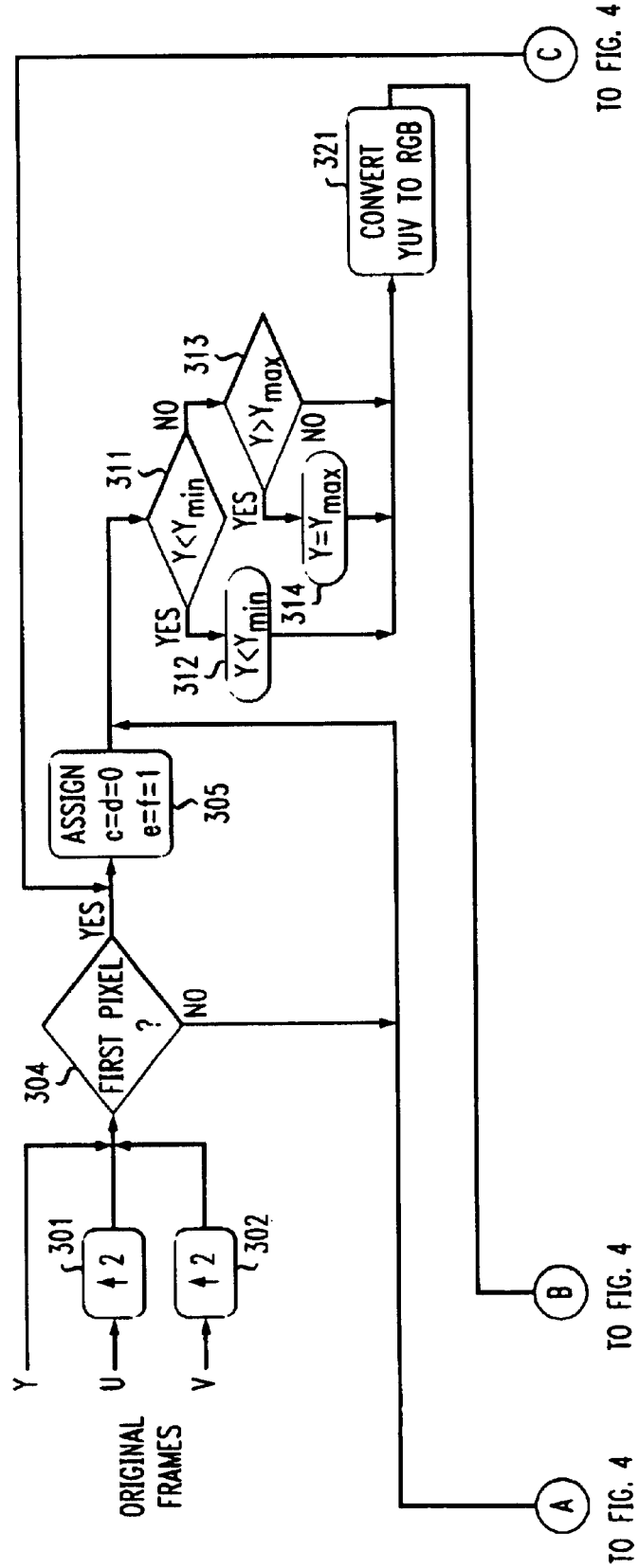
FIGS. 3, 4 and 5, when arranged as shown in FIG. 6, show a flowchart of the processing performed by the chrominance processor.
Figure 4:
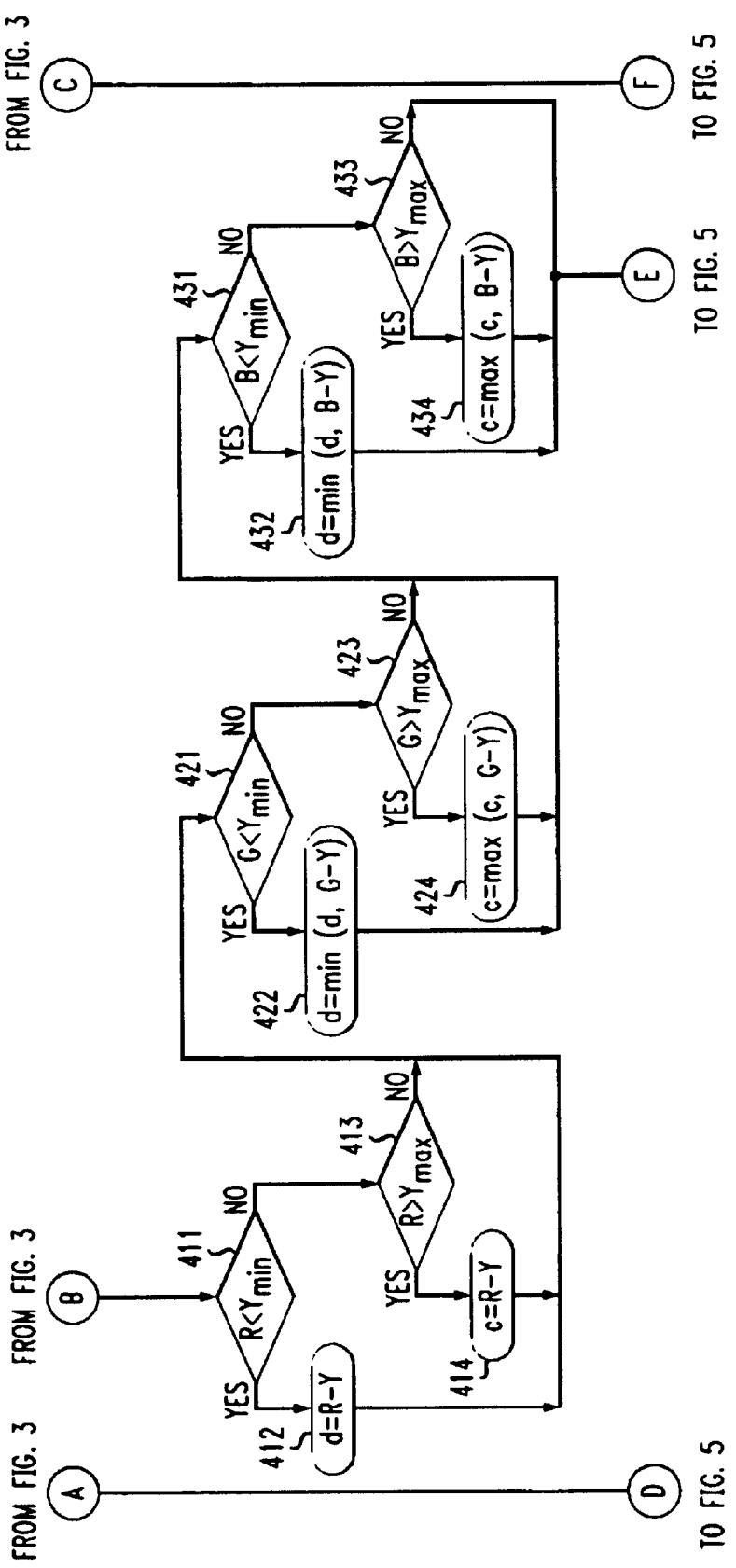
Figure 5:
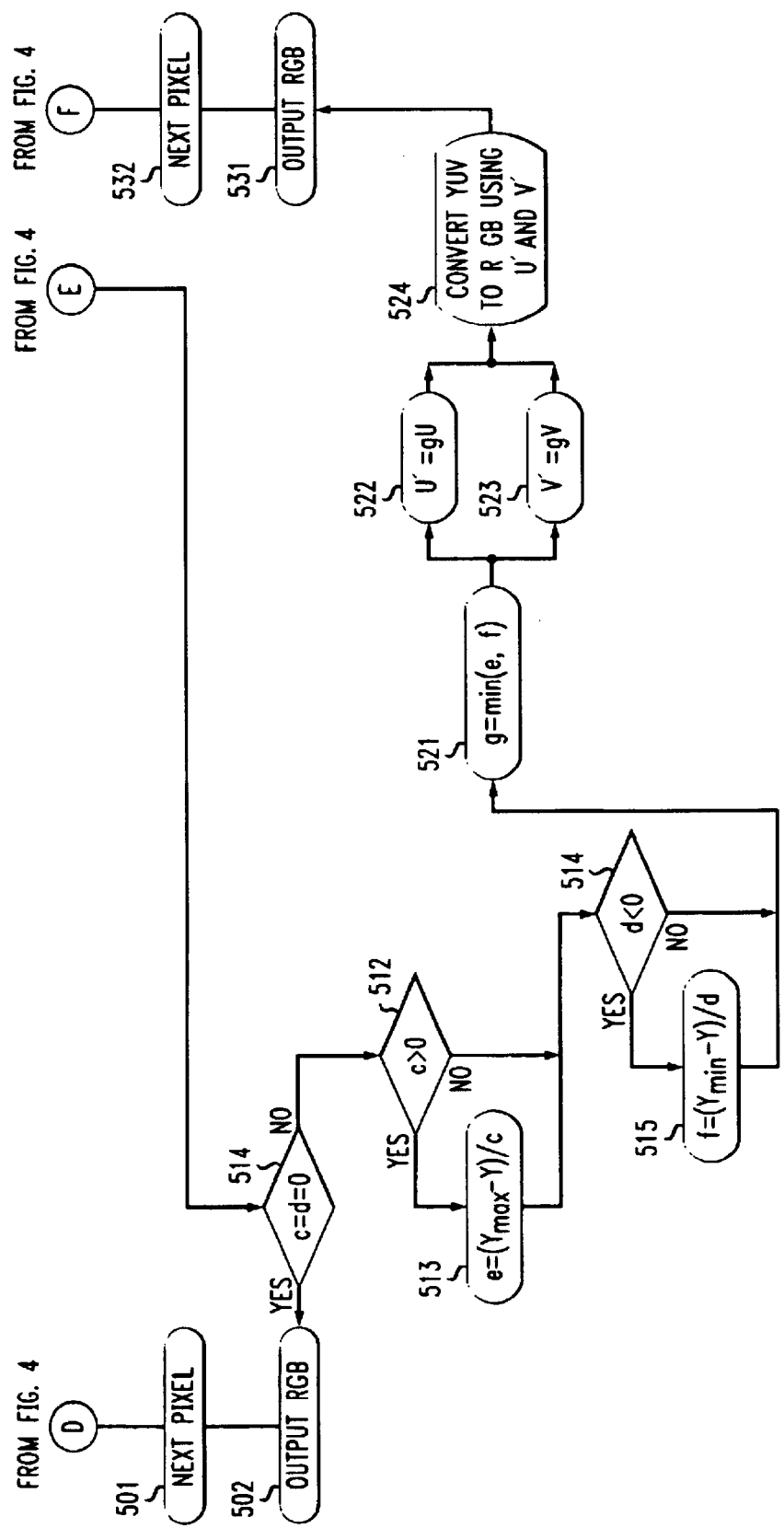

Returning now to FIG. 1, we are now prepared to consider the operation of chrominance processor 333 in conjunction with inverse color space converter 33 to implement an embodiment of the invention consistent with the description hereinabove. To this end, FIGS. 3, 4 and 5, when arranged as shown in FIG. 6, show a flowchart of an illustrative process performed by inverse color space converter 33 and chrominance processor 333 for carrying out that processing. The various parameters and signal components shown in the flowchart, such as R, G, B, U, V c, d, e, f and g are the same as those mentioned in the discussion above. In addition to performing YUV-to-RGB conversion which, as will be seen, is performed at blocks 321 and 524 of the flowchart, inverse color space converter 33 carries out the functions performed at the following additional blocks: 301, 302, 311 through 314, 501, 502, 531 and 532. The functions performed at the other blocks of the flowchart are carried out by chrominance processor 333. Lead bundle 334 interconnecting these two elements carries the various parameter and signal component values needed to carry out the functions described.

As shown in the flowchart, the U and V components are first subjected to so-called upsampling at blocks 301 and 302, which is carried out in inverse color space converter 33. Image coding such as MPEG coding allows for the possibility of representing a frame of image information of, say, N×N pixels using $N^2$ luminance (Y) values, i.e., one for every pixel, but using only $(N/2)^2$ chrominance (U and V) values, each of which is a function of the U and V values of some number of the pixels. It is assumed that that is the case in the present illustrative embodiment. However, a U and V value are needed for each pixel in order to convert the image representation back into RGB space, as well as to carry out processing implementing the present invention. To this end, the U and V component values are upsampled in conventional fashion so as to provide a U and V value for each pixel.

Inverse color space converter 33 generates R, G and B values from the Y, U and V components received from MPEG decoder 36. These are passed to chrominance processor 333 along with the received Y, U and V values.

Chrominance processor 333 determines at block 304 whether the pixel under consideration is the first pixel of the image to be processed. If it is, then it is necessary to assign initial values to c, d, e, and f at block 305. In particular, c and d are initialized to 0 and e and f are initialized to 1.

A step not mentioned earlier is now performed. It was assumed above that the luminance component Y will always be within its allowed range $[Y_{min}, Y_{max}]$. It is possible, however, that as a result of any of the phenomena mentioned above, the value of Y will be outside of that range. In that case, it is necessary that the value of Y be brought to within the allowed range $[Y_{min}, Y_{max}]$. In particular, if it is determined at block 311 that $Y<Y_{min}$, then the value of Y is changed at block 312 so that $Y=Y_{min}$. On the other hand, if it is determined at block 313 that $Y>Y_{max}$, then the value of Y is changed at block 314 so that $Y=Y_{max}$.

The YUV signal is then converted to RGB form at block 321. The values of R, G and B thus arrived at will be examined in the course of subsequent processing to determine whether any of them is out of the allowed range $[Y_{min}, Y_{max}]$, necessitating attenuation of U and V in accordance with the invention. If attenuation of U and V does not prove necessary, those R, G and B values will be the ones presented to display 31. Otherwise, another conversion from YUV space to RGB space will be made using attenuated values of U and V and the resulting values of R, G and B will be the ones presented to the display 31.

In particular, the R, G and B components are examined, one at a time, beginning with R, to ascertain whether any of them is out of the allowed range $[Y_{min}, Y_{max}]$ and, if so, to compute the values of c and d, per Eqs. (2) and (3) above. In particular, if $R<Y_{min}$, as determined at block 411, then d will take on the value of R's chrominance contribution, R−Y, unless it turns out as the processing continues that the chrominance contribution of G or B is an even smaller number, i.e., is a negative number of larger magnitude. Tentatively, then, we set d=R−Y at block 412. If, on the other hand, $R>Y_{max}$, as determined at block 413, then c will take on the value of R's chrominance contribution, R−Y, unless it turns out as the processing continues that the chrominance contribution of G or B is larger. Tentatively, then, we set c=R−Y at block 414.

Similar processing is then carried out vis-a-vis component G. In particular, if $G<Y_{min}$, as determined at block 421, then at block 422 the value of d will be set to be the "min" (i.e., the smaller of) d's own present value and the value of G's chrominance contribution, G−Y. If G−Y is, in fact, smaller, i.e., is a negative number with a larger magnitude, than the present value of d, this means that even if the value of R was less than $Y_{min}$, G is even more so. If, on the other hand, $G>Y_{max}$, as determined at block 423, then at block 424 the value of c will be set to be the "max" (i.e., the larger of) c's own present value and the value of G's chrominance contribution, G−Y. If G−Y is, in fact, larger than the present value of c, this means that even if R was larger than $Y_{max}$, G is even more so.

Similar processing is then carried out at blocks 431, 432, 433 and 434 vis-a-vis component B, resulting in the value of d becoming equal to B−Y if B is less than $Y_{min}$ by even more than R or G are, or the value of c becoming equal to B−Y if B is greater than $Y_{max}$ by even more than R or B are.

The values of c and d are then examined at block 511. If any one or more of the components R, G and B were out of the allowed range [$Y_{min}, Y_{max}$], one or both of the values of c and d will have been changed from their initialized values of 0. Otherwise not. Thus if the test at block 511 shows that c=d=0, this means that all three components were within range and no chrominance attenuation is necessary. The values of R, G and B generated at block 321 are the ones that are output to display 31, as indicated at block 502. The processing thereupon proceeds to process the Y, U and V values of the next pixel, as indicated at block 501. Inasmuch as the values of c, d, e and f have not changed, the flow of control passes to block 311.

However, if one or both of c and d were not equal to 0, the processing proceeds to block 512 wherein it is determined if c>0, meaning that at least one of the R, G and B components was out of the allowed range [$Y_{min}, Y_{max}$] by being greater than $Y_{max}$. In that case, we need to compute the attenuation factor e=c'/c=($Y_{max}$−Y)/c at block 513. The processing proceeds to block 514 wherein it is determined if d>0, meaning that at least one of the R, G and B components was out of the allowed range [$Y_{min}, Y_{max}$] by being less than $Y_{min}$. In that case, we compute the attenuation factor f=d'/d=($Y_{min}$−Y)/d at block 515.

The ultimate attenuation factor $0 \leq g < 1$ is then set at block 521, its value being the minimum of e and f. We need to use the smaller of e and f as the value of g in order to ensure that all R, G and B components that were out of the allowed range [$Y_{min}, Y_{max}$] either by being greater than $Y_{max}$ or less than $Y_{min}$ will be brought into the allowed range [$Y_{min}, Y_{max}$]. If only one of the parameters e and f was set at blocks 513 and 515, we ensure that its value will be the one produced by the "min" function performed at block 521 by virtue of the initialization e=f=1 that was carried out at block 305. At this point, then U and V are attenuated to new, smaller values U'=gU and V'=gV at blocks 522 and 523, respectively. Conversion from YUV space to RGB space using the new values of U' and V' is thereupon made at block 524. The resulting R, G and B values are the ones presented to display 31, at block 531. The processing thereupon proceeds to process the Y, U and V values of the next pixel, as indicated at block 532. Inasmuch as the values of c, d, e and f have changed, the flow of control passes to block 305 where those parameters are re-initialized.

The foregoing merely illustrates the principles of the invention.

For example, although the processing embodying the principles of the invention is carried out in YUV space in the disclosed embodiment, other embodiments may carry out that processing in other non-primary-color spaces having components whose level of modification is desired to be controlled. For example, in the present embodiment it is desired that the luminance component of each pixel be preserved. In other embodiments, however, it may be some other picture quality or qualities that are desired to be preserved, while allowing for the attenuation of the remaining components. If, for example, it were to be decided that it is crucial that color hue not be allowed to be modified in the course of bringing the primary color space components to within the allowed range, the invention could be carried out in so-called HSV (hue, saturation, value) space with only the S and V components being attenuated and the H, i.e., hue, component being left unchanged.

Although the invention is implemented in the disclosed illustrative embodiment in a system that uses MPEG coding, it is equally applicable to systems in which other types of image coders, such as JPEG, ITU or even non-standardized coders are used.

In the present embodiment, the luminance component Y is not modified at all unless it is out of bounds. In other embodiments, it may be desired to allow some small variation in that component.

All examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The block diagrams herein represent conceptual views of illustrative circuitry embodying the principles of the invention. Thus the functions of the various elements shown in the FIGS. may be provided through the use of dedicated hardware as well as hardware capable of executing software in association with appropriate software. When provided by a processor, the functions may be provided by a single dedicated processor, by a single shared processor, or by a plurality of individual processors, some of which may be shared. The functions of those various elements may be implemented by, for example, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent to those shown herein.

Similarly, it will be appreciated that the flow chart shown herein represents various processes which may be substantially represented in computer-readable medium and so executed by a computer or processor, whether or not such computer or processor is explicitly shown. Moreover, in the flowcharts shown herein, the various blocks can be understood as representing not only processing and/or other functions but, alternatively, as blocks of program code that carry out such processing or functions.

It will thus be appreciated that those skilled in the art will be able to devise various arrangements which, although not explicitly described or shown herein, embody the principles of the invention and are included within their spirit and scope.

What is claimed is:

1. A method for use in a system in which a signal is presented to a display, the signal representing the values of components representing an image in a first image-representation space, the method being carried out in response to an indication that the value of at least a particular one of said components would be outside of a predetermined allowed range when presented to said display, the method comprising modifying the values of at least one but less than all of the components that represent said image in a second image-representation space, said modifying being such as to ensure that if said image were to be converted from said second image-representation space to said first image-representation space, said particular component would be within said allowed range, wherein said image is comprised of a plurality of pixels, wherein each said pixel is represented by a first set of component values in said first image-representation space and by a second set of component values in said second image-representation space, wherein the first image-representation space is a primary color space, wherein the second image-representation space is a luminance-chrominance space, wherein said primary color space is RGB space in which each pixel is represented by the values of a red component, a green component and a blue component, and wherein in said luminance-chrominance space each said pixel is represented by the values of a luminance component Y and at least one chrominance component.

2. The invention of claim 1 wherein said modifying comprises attenuating said at least one chrominance component while not attenuating said luminance component.

3. The invention of claim 2 wherein said attenuating is carried out by multiplying each said chrominance component representing a particular pixel by an attenuation factor g, $0 \leq g < 1$ having a value associated with that pixel.

4. The invention of claim 3 wherein the value of said attenuation factor g is the smaller of first and second attenuation factors e and f each associated with said particular pixel, the value of said attenuation factor e being such as to ensure that upon conversion of said image from said luminance-chrominance space to said primary color space, any primary color space component representing said particular pixel that was most above said allowed range would be brought to the upper limit of said allowed range and any other primary color space component representing said particular pixel that was above said allowed range would be brought within said allowed range, and the value of said attenuation factor f being such that being such as to ensure that upon conversion of said image from said luminance-chrominance space to said primary color space, any primary color space component representing said particular pixel that was most below said allowed range would be brought to the lower limit of said allowed range and any other primary color space component representing said particular pixel that was below said allowed range would be brought within said allowed range.

5. A method for use in a system in which a signal is presented to a display, the signal representing the values of components representing an image in a first image-representation space, the method being carried out in response to an indication that the value of at least a particular one of said components would be outside of a predetermined allowed range when presented to said display, the method comprising modifying the values of at least one but less than all of the components that represent said image in a second image-representation space, said modifying being such as to ensure that if said image were to be converted from said second image-representation space to said first image-representation space, said particular component would be within said allowed range, wherein said image is comprised of a plurality of pixels, wherein each said pixel is represented by a first set of component values in said first image-representation space and by a second set of component values in said second image-representation space, wherein the first image-representation space is a primary color space, wherein the second image-representation space is a luminance-chrominance space, and wherein said luminance-chrominace space is YUV space in which each said pixel is represented by the values of a Y luminance component and U and V chrominance components.

6. The invention of claim 5 wherein said modifying comprises attenuating said chrominance components while not attenuating said luminance component and wherein said attenuating is carried out by multiplying each of said chrominance components representing a particular pixel by an attenuation factor g, $0 \leq g < 1$, said attenuation factor g having a value that is associated with that pixel and that is such as to ensure that upon conversion of said image from YUV space to said primary color space, the primary color space component that was most outside of said allowed range would be brought to one of the limits of said allowed range and any other primary color space component that was outside of said allowed range would be brought within said allowed range.

7. A method for ensuring that the values of all of the component values of each pixel comprising an image represented in a primary color space are within an allowed range, the method being performed only for ones of the pixels whose primary color space component values are not already within that allowed range, the method comprising converting a luminance-chrominance space representation of each of said ones of said pixels to a primary color space using attenuated chrominance components of those pixels and a non-attenuated luminance component thereof, wherein said primary color space is RGB space and said luminance-chrominance space is YUV space.

8. The invention of claim 7 wherein said converting comprises generating, for each of said ones of said pixels, RGB space component values R', G' and B' whose values are given by $$R' = Y + a_1(U') + b_1(V')$$

$$G' = Y + a_2(U') + b_2(V')$$

$$B' = Y + a_3(U') + b_3(V')$$

where U' and V' are said attenuated chrominance components, Y is said unattenuated luminance component and $a_1, a_2, a_3, b_1, b_2, b_3$ are predefined coefficients.

9. A method for use in a system in which each pixel of an image is represented by respective associated R, G and B component values, the R, G and B component values representing a particular pixel having the same luminance contribution as one another, and each having a respective chrominance contribution, the method comprising for each pixel whose associated R, G and B component values are each within a respective predetermined allowed range, applying a signal representing those R, G and B component values to a display, and for each pixel any one of whose associated R, G or B component values is not within its respective allowed range, applying R', G' and B' component values to said display, the R', G' and B' component values each having said same luminance contribution, and R', G' and B' having as their respective chrominance contributions the chrominance contributions of said associated R, G and B component values, respectively, attenuated by an attenuation factor g having a value associated with each such pixel.

10. The invention of claim 9 wherein the values of said R, G and B component values are given by $$R=Y+a_1U+b_1V$$

$$G=Y+a_2U+b_2V$$

$$B=Y+a_3U+b_3V$$

and wherein said R', G' and B' component values are given by $$R'=Y+a_1(U')+b_1(V')$$

$$G'=Y+a_2(U')+b_2(V')$$

$$B'=Y+a_3(U')+b_3(V')$$

where Y is the value of said luminance contribution, $a_1 U+b_1 V$ is the chrominance contribution of said R component value, $a_2 U+b_2 V$ is the chrominance contribution of said G component value, $a_3 U+b_3 V$ is the chrominance contribution of said B component value, $a_1$, $a_2$, $a_3$, $b_1$, $b_2$, $b_3$ are predefined coefficients, U and V are chrominance components of a luminance-chrominance space representation of said each pixel of the image, U'=gU, V'=gV, g is said attenuation factor, and $0 \leq g < 1$.

11. A method of processing pixels of an image represented in luminance-chrominance space comprising a) for each pixel whose R, G and B component values will be within respective predetermined allowed ranges upon conversion of that pixel from luminance-chrominance space to RGB space, performing that conversion, b) for each pixel where at least one of its R, G and B component values would be outside of its respective predetermined allowed range upon conversion of that pixel from luminance-chrominance space to RGB space, performing a conversion of that pixel from luminance-chrominance space to RGB space using attenuated chrominance component values and an unattenuated luminance component value, and c) applying to a display a signal representing all of the converted pixels, wherein the attenuated chrominance component values are all attenuated by a factor g, and wherein the luminance-chrominance space is YUV space, said luminance component is Y and said chrominance components are U and V.

12. Apparatus for processing pixels of an image represented in luminance-chrominance space comprising a) for each pixel whose R, G and B component values will be within respective predetermined allowed ranges upon conversion of that pixel from luminance-chrominance space to RGB space, means for performing that conversion, b) for each pixel where at least one of its R, G and B component values would be outside of its respective predetermined allowed range upon conversion of that pixel from luminance-chrominance space to RGB space, means for performing a conversion of that particular pixel from luminance-chrominance space to RGB space using attenuated chrominance component values and an unattenuated luminance component value, and c) means for applying a signal representing the converted pixels to a display, wherein the attenuated chrominance component values are all attenuated by a factor g having a value associated with said particular pixel, and wherein the luminance-chrominance space is YUV space, said luminance component is Y and said chrominance components are U and V.

13. Apparatus for processing a signal representing an image in YUV space, said signal including for each of a plurality of pixels of said image an associated Y luminance component and associated U and V chrominance components, said apparatus comprising converting means operative for converting the Y, U and V components associated with each pixel to R, G and B components, and means for modifying the operation of said converting means by attenuating, prior to said converting, the values of the U and V chrominance components associated with each one of said pixels any of whose R, G or B component values would otherwise be outside of a respective allowed range, the attenuating of the U and V chrominance values being by an attenuation factor, g, having a value associated with said each one of said pixels, the value of g being such that the R, G and B component values associated with said each one of said pixels is within said allowed range after said converting, the value of Y for said each one of said pixels being not attenuated by said attenuation factor g.

* * * * *